United States Patent [19]

Tachibana

[11] Patent Number: 5,021,990
[45] Date of Patent: Jun. 4, 1991

[54] OUTPUT PULSE GENERATING APPARATUS

[75] Inventor: Masayoshi Tachibana, Kawasaki, Japan

[73] Assignee: Kabushiki Kaisha Toshiba, Kawasaki, Japan

[21] Appl. No.: 184,401

[22] Filed: Apr. 20, 1988

[30] Foreign Application Priority Data

Apr. 30, 1987 [JP] Japan .................. 62-106831

[51] Int. Cl.⁵ .................. G06F 13/00; H03K 3/00
[52] U.S. Cl. .................. 364/900; 364/934
[58] Field of Search .................. 123/417 (U.S. only); 364/200 MS File, 900 MS File

[56] References Cited

U.S. PATENT DOCUMENTS

| | | | |
|---|---|---|---|
| 4,257,108 | 3/1981 | Igez | 364/900 |
| 4,292,941 | 10/1981 | Suzuki | 123/417 |
| 4,472,776 | 9/1984 | Deleris | 123/417 |
| 4,499,544 | 2/1985 | Ohba et al. | 123/417 |
| 4,502,454 | 3/1985 | Hamai et al. | 123/417 |
| 4,561,056 | 12/1985 | Hirayama | 123/417 |

FOREIGN PATENT DOCUMENTS 3119650 5/1982 Fed. Rep. of Germany .
3417816 11/1985 Fed. Rep. of Germany .
60-2510 5/1985 Japan .

OTHER PUBLICATIONS

Elektron., Nachrichtentechm, Berlin 33 (1983) 1, pp. 16–18.
A. H. Seidman, "Integrated Circuits Applications Handbook", John Wiley & Sons, New York, 1983, pp. 259–273, 387–388.

*Primary Examiner*—Lawrence E. Anderson
*Attorney, Agent, or Firm*—Oblon, Spivak, McClelland, Maier & Neustadt

[57] ABSTRACT

A pulse generating apparatus comprises a command memory for storing a command which includes an output value at each time point of a pulse to be generated. The command is executed by a sequencer and the output value is supplied to an output memory from the sequencer, to be stored therein. The output memory supplies the output value to an output circuit, in synchronism with reference time point signals, and the output circuit forms the pulse from this output value.

7 Claims, 15 Drawing Sheets

FIG. 7A  NOP COMMAND  0 0 0 0

FIG. 7B  TRANS COMMAND  0 1

FIG. 7C  TRANS ALL COMMAND  0 0 0 1

FIG. 7D  TRANS ADD COMMAND  1 0

FIG. 7E  TRANS ADD ALL COMMAND  0 0 1 0

FIG. 7F  LOADITV COMMAND  1 1

FIG. 7G  SELITV COMMAND  0 0 1 1

| ADDRESS OF COMMAND MEMORY | COMMAND | | |
|---|---|---|---|
| 0 | TRANS | A, 0, 0 | ① |
| 2 | TRANS | B, 0, 0 | |
| 4 | TRANS | C, 0, 0 | |
| 6 | TRANS | D, 0, 0 | |
| 8 | TRANS | A, 1, 4 | ② |
| 10 | TRANS | A, 0, 12 | |
| 12 | TRANS | B, 1, 12 | ③ |
| 14 | TRANS | C, 1, 4 | ④ |
| 16 | TRANS | C, TOGGLE 9 | |
| 18 | TRANS | C, TOGGLE 11 | |
| 20 | TRANS | C, 0, 14 | |
| 22 | LOADITV | R0, 6 | ⑤ |
| 24 | TRANSADD | D, 1, 1 | |
| 26 | TRANSADD | D, 0, 3 | |
| 28 | NOP | | ⑥ |
| 30 | NOP | | |

F I G. 8

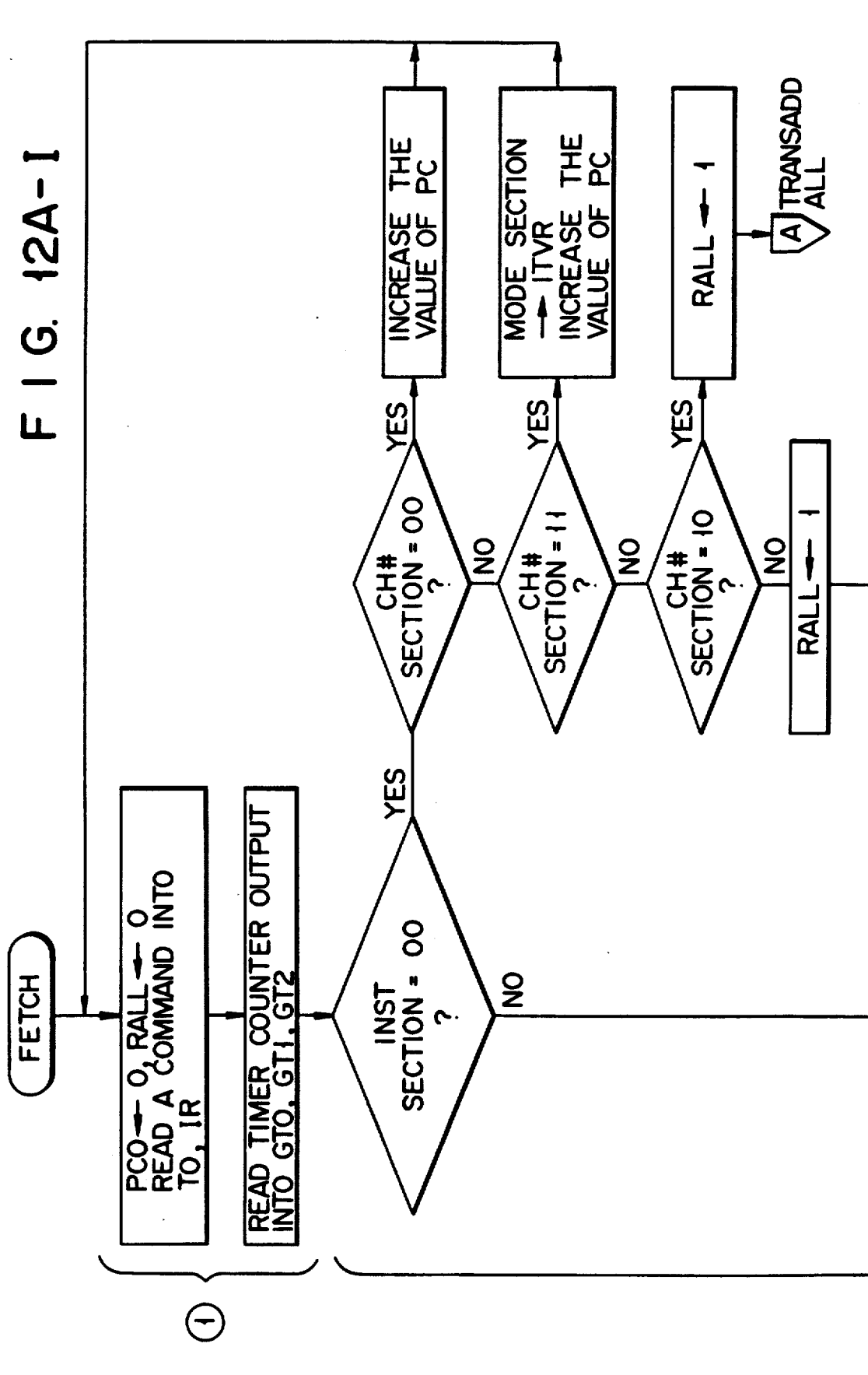

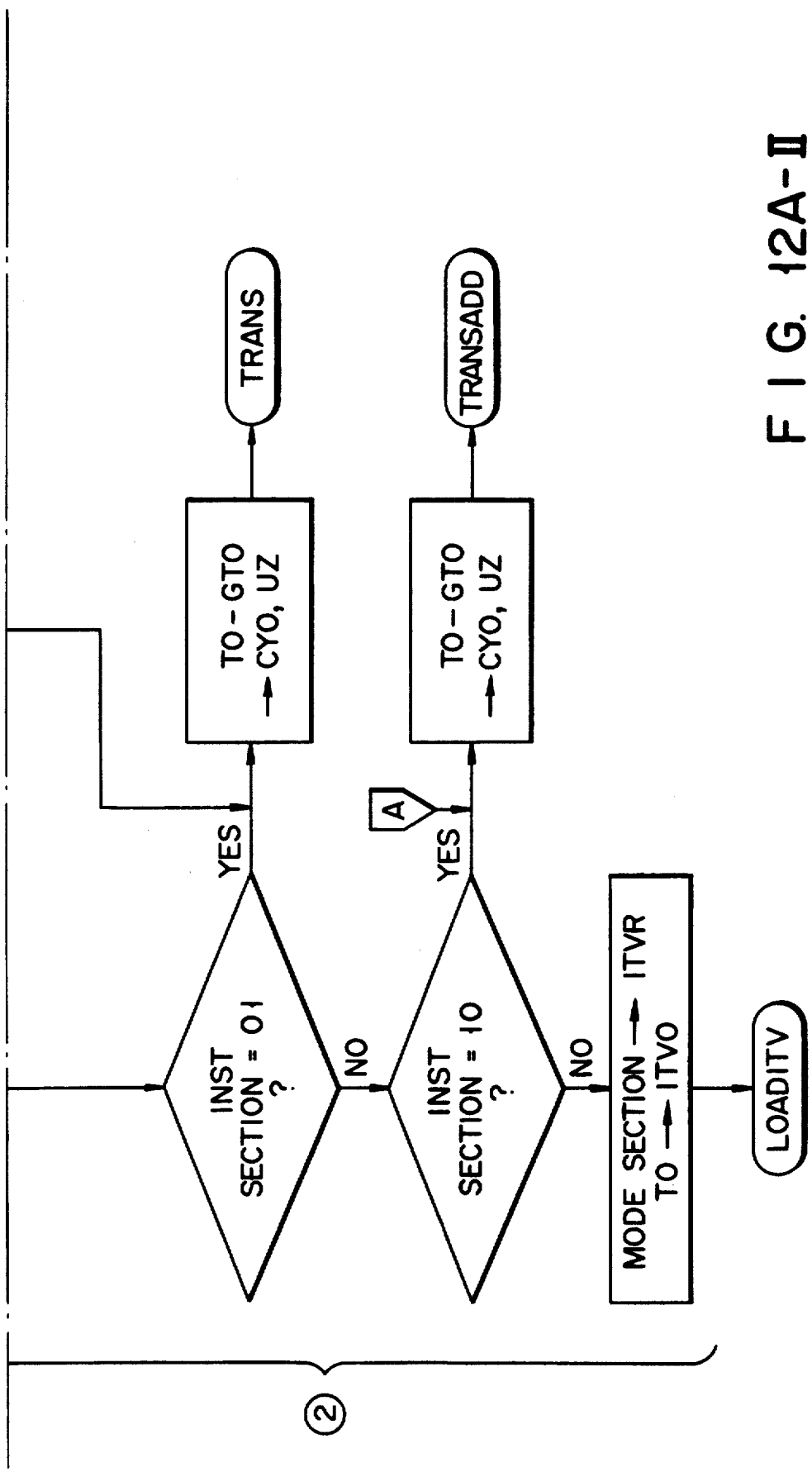

TIMER COUNTER 6

OUTPUT PULSE GENERATING APPARATUS

BACKGROUND OF THE INVENTION

The present invention relates to an output pulse generating apparatus for generating and outputting an output pulse having an arbitrary waveform in accordance with a command supplied from a CPU (central processing unit).

An output pulse generating apparatus can generate an output pulse base on data for designating an output value of a pulse to be generated and data for designating an output timing of the output value, both of which are sent from a CPU. An apparatus capable of generating such an output pulse is combined with an actuator and used for controlling various apparatuses. For example, an output pulse generating apparatus used for automobile engine control is disclosed in Japanese Patent Publication No. 60-2510. This apparatus will be described with reference to FIG. 1.

Referring to FIG. 1, a CPU (not shown) sets time points TA, TB, TC, and TD of state changes (changes in output value) of respective output pulses A, B, C, and D (refer to FIG. 2) in corresponding registers 101, 102, 103, and 104. The CPU also sets output values DA, DB, DC, and DD at the respective state change time points in registers 105, 106, 107, and 108. A reference time point signal designating a reference time point generated by timer counter 109, and time points TA to TD stored in registers 101 and 104 are time-divisionally switched by change over switch 110 and compared with each other in comparator 111. This comparison result is time-divisionally switched by change over switch 112 and sequentially supplied to the G terminals of D-type flip-flops 113, 114, 115, and 116. Output values DA to DD are latched by flip-flops 113 to 116 in accordance with the comparison result, and output pulses A, B, C and D are generated.

When 4 output values A, B, C, and D in FIG. 2 are obtained using the pulse generating apparatus in FIG. 1, the CPU (not shown) performs processing in FIG. 3.

More specifically, after the CPU sets output values DA to DD and time points TA to TD in registers 101 to 108, the CPU performs other operations until an interruption is generated in response to a coincidence output from comparator 111. When the interruption is generated, the CPU sets the next values in corresponding registers. In FIG., ①  to ⑬ to indicate the respective processing sections divided by interruptions to the CPU. By performing the above processing, the CPU can perform other operations for a time other than the time from when the CPU receives an interruption to when time point data TA to TD and output data DA to DD are updated.

The conventional apparatus in FIG. 1 poses the following drawbacks. Since comparison and latch operations are time-divisionally performed in each channel (one pulse corresponding to one channel), even if the set time points of the output timing of output values A to D coincide with each other as indicated by a broken line in FIG. 4A, in practice, the time points of output pulses A, B, C. and D are successively shifted by ts. In this case, ts indicates a time interval required for the switching operation of change over switches 110 and 112. For this reason, precision in pulse output time point is degraded.

Since only a pulse state change at a given time point can be controlled between interruptions to the CPU at the first and second time points, the leading and trailing edges must be set for each pulse even in the case of periodic pulses. Therefore, a load on the CPU is increased. In addition, since a minimum time interval between state changes in output pulse is influenced by operation clocks, a narrow-width pulse or a high-speed pulse cannot be produced.

SUMMARY OF THE INVENTION

It is, therefore, an object of the present invention to provide an output pulse generating apparatus capable of eliminating the drawbacks of the prior art output pulse generating apparatus.

An output pulse generating apparatus according to this invention comprises a central processor unit sending forth a command including an output value at each time point of a pulse to be generated; a command memory coupled to the central processor unit to store the command; a timer counter producing reference signals denoting reference time points; a sequencer coupled to the command memory and the timer counter; an output memory coupled to the timer counter and the sequencer for storing through the sequencer the output value of the pulse at the time point; and an output circuit coupled to the central processor unit and the output memory for reading the output value of the pulse from an address of the output memory corresponding to the reference time point and forming the pulse from the output value read out from the output memory. The sequencer subsequently reads out the commands stored in the command memory and, when a time difference between a time point set in a command read out and a reference time point denoted by a reference time point signal is less than a time duration predetermined by the memory capacity of the output memory, executes the command and writes the output value read out from the executed command into the output memory.

According to the present invention, the sequencer executes the command when a time difference between a time point designated by a command and a reference time point is less than a time duration predetermined by the memory capacity of the output memory, i.e., when the output value can be written in the output memory. Then, the sequencer writes an output value in the output memory before an output circuit sends forth a pulse. For this reason, outputs of a plurality of channels (a plurality of pulses) can be written in the output memory in advance. The output memory outputs an output value of each channel corresponding to each reference time in synchronism with the reference time point signals. Therefore, pulses with high time precision can be obtained from the output circuit.

According to the present invention, the timing at which an output value is written into the output memory through the sequencer is not synchronized with that of which the output value is written into the output circuit through the output memory. Therefore, one-to-one correspondence of a command and a pulse state change is not required. For example, when a pulse having a constant period is to be generated, a single command can designate a plurality of state changes of a pulse at a plurality of time points. For this reason, the number of command descriptions can be decreased, and hence a load on the CPU can be reduced.

Furthermore, according to the present invention, an output value is written in advance through the sequencer, and the written output value is read into the output circuit in synchronism with a reference time point. Consequently, a minimum time between two state changes of an output pulse is determined by a clock supplied to the timer counter, and is not influenced by an interrupt to the CPU. Therefore, a narrow-width pulse or a high-speed pulse can be easily generated. In addition, since output values of a plurality of channels can be read out at the same timing, lags in pulses in FIG. 4B do not occur.

BRIEF DESCRIPTION OF THE DRAWINGS

FIGS. 7A to 7G are views illustrating various types of commands;

FIG. 8 is a view showing descriptions of commands for generating pulses corresponding to those in FIG. 2;

FIGS. 12A, 12B, 12C, and 12D are flow charts for explaining an operation of the sequencer in FIG. 5;

DETAILED DESCRIPTION OF THE PREFERRED EMBODIMENT

Figure 5:
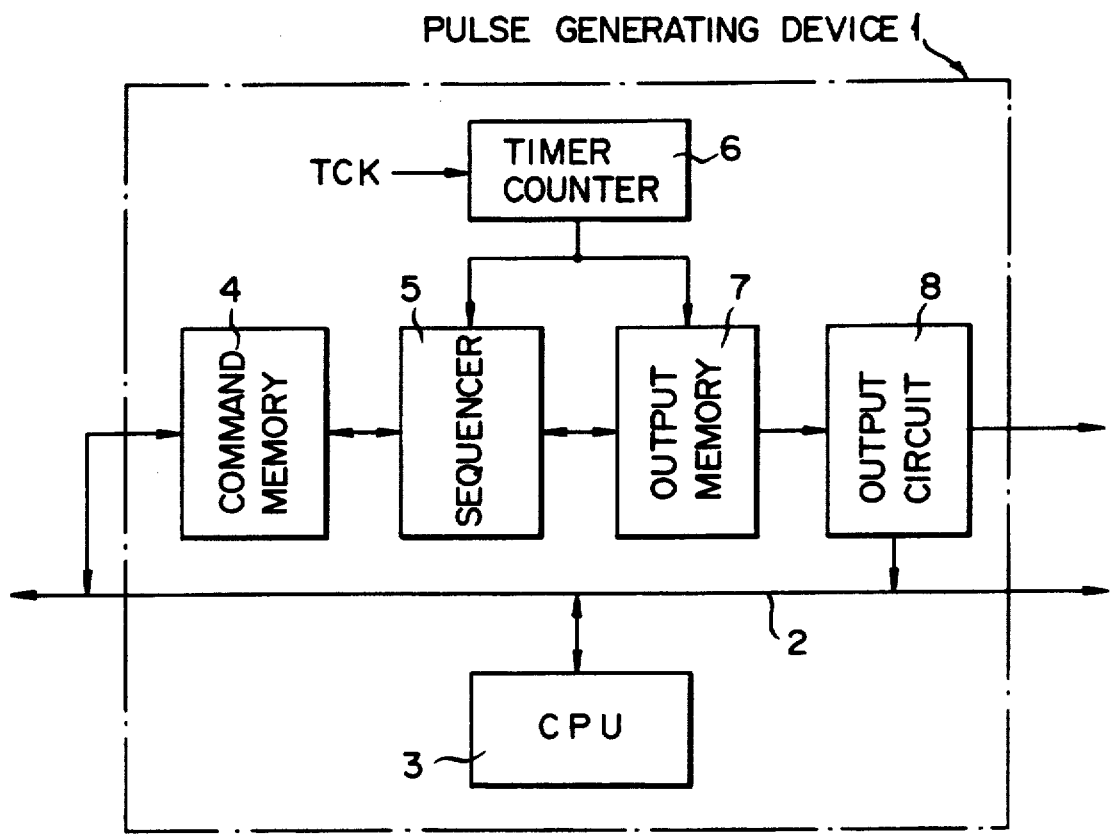
FIG. 5 is a block diagram showing an entire arrangement of an embodiment according to the present invention.

Referring to FIG. 5, output pulse generating apparatus 1 comprises CPU (central processor unit) 3, command memory 4 for storing commands, which are sent from CPU 3 and used for generating output pulses, timer counter 6 for producing a reference time point signal designating a reference time point, sequencer 5 coupled to command memory 4 and timer counter 6 and adapted to sequentially execute the commands stored in command memory 4, output memory 7 coupled to sequencer 5 and timer counter 6 and adapted to store each output value at a corresponding time point at which sequencer 5 executes a corresponding command, and output circuit 8 coupled to output memory 7 and CPU 3 and adapted to generate an output pulse in accordance with an output value read out from output memory 7 in synchronism with the reference time point from timer counter 6.

Figure 1:
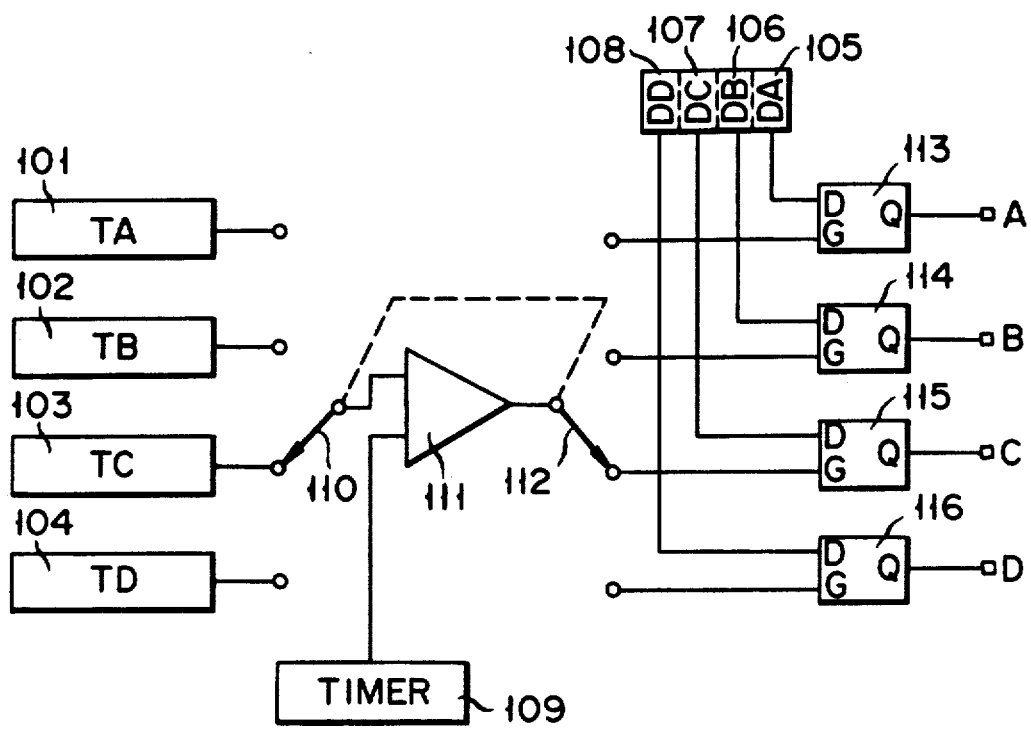
FIG. 1 is a block diagram of a prior art output pulse generating apparatus.
Figure 2:
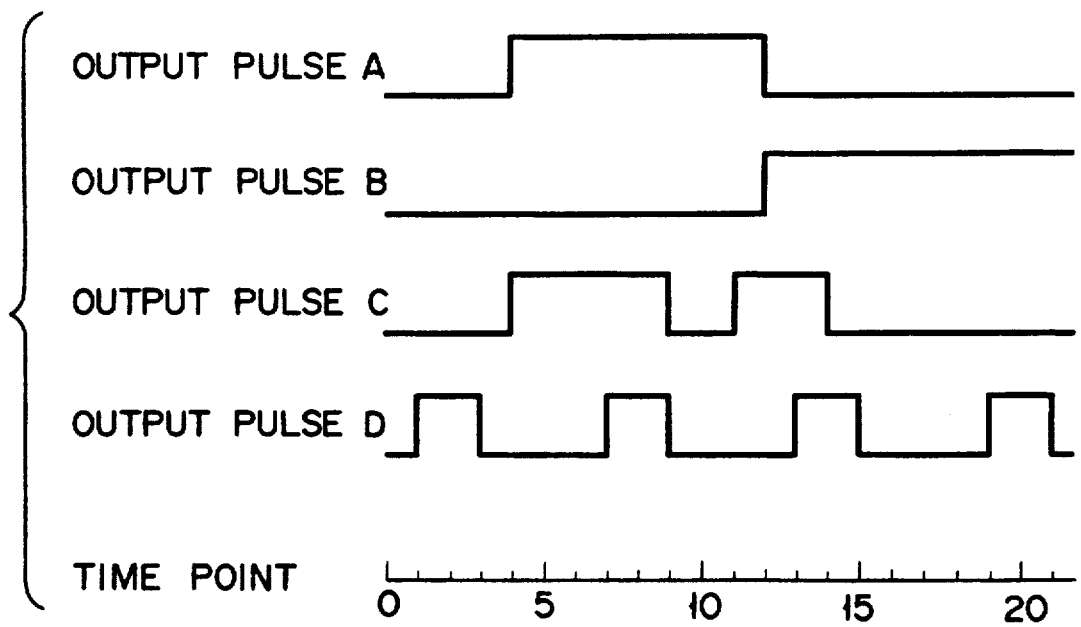
FIG. 2 is a timing chart showing an example of state changes of output values with respect to time points of output pulses.
Figure 3A:
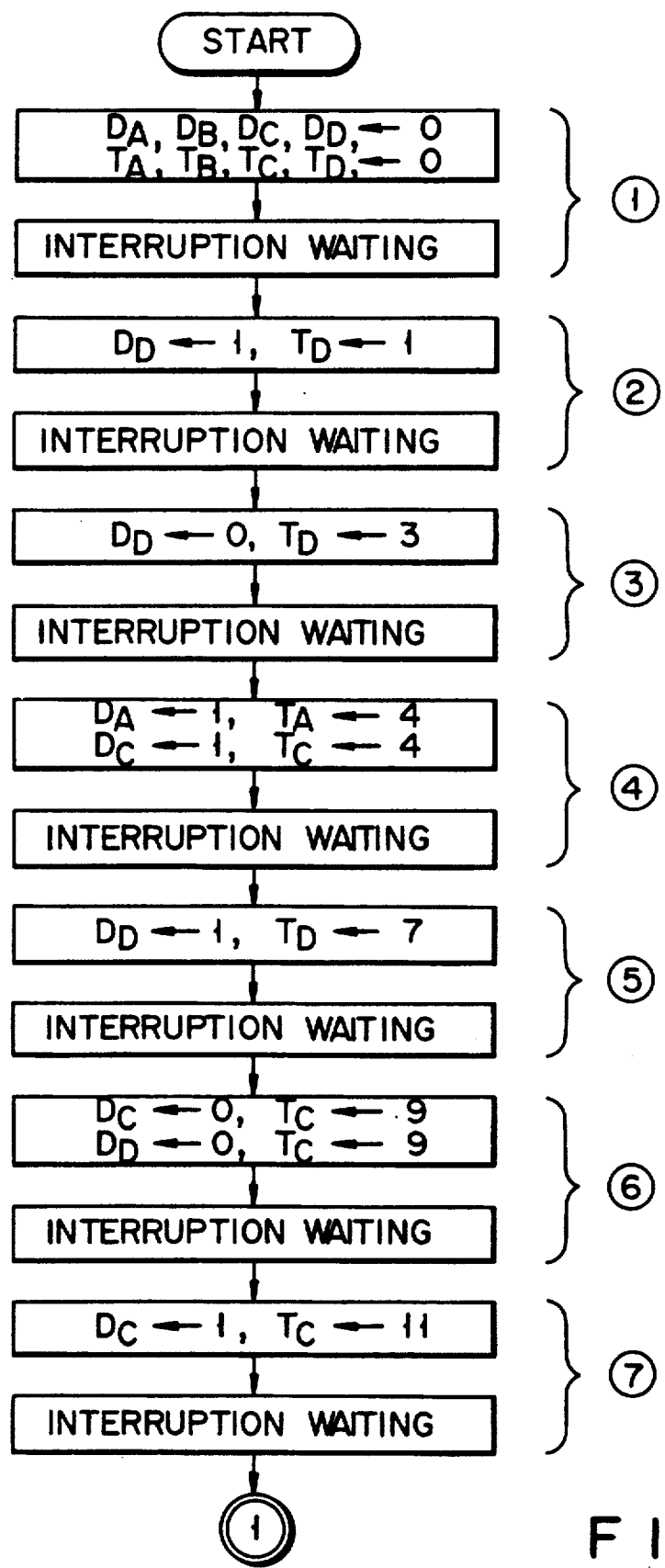
FIGS. 3A and 3B show a flow chart for explaining an operation of the prior art output pulse generating apparatus.
Figure 3B:
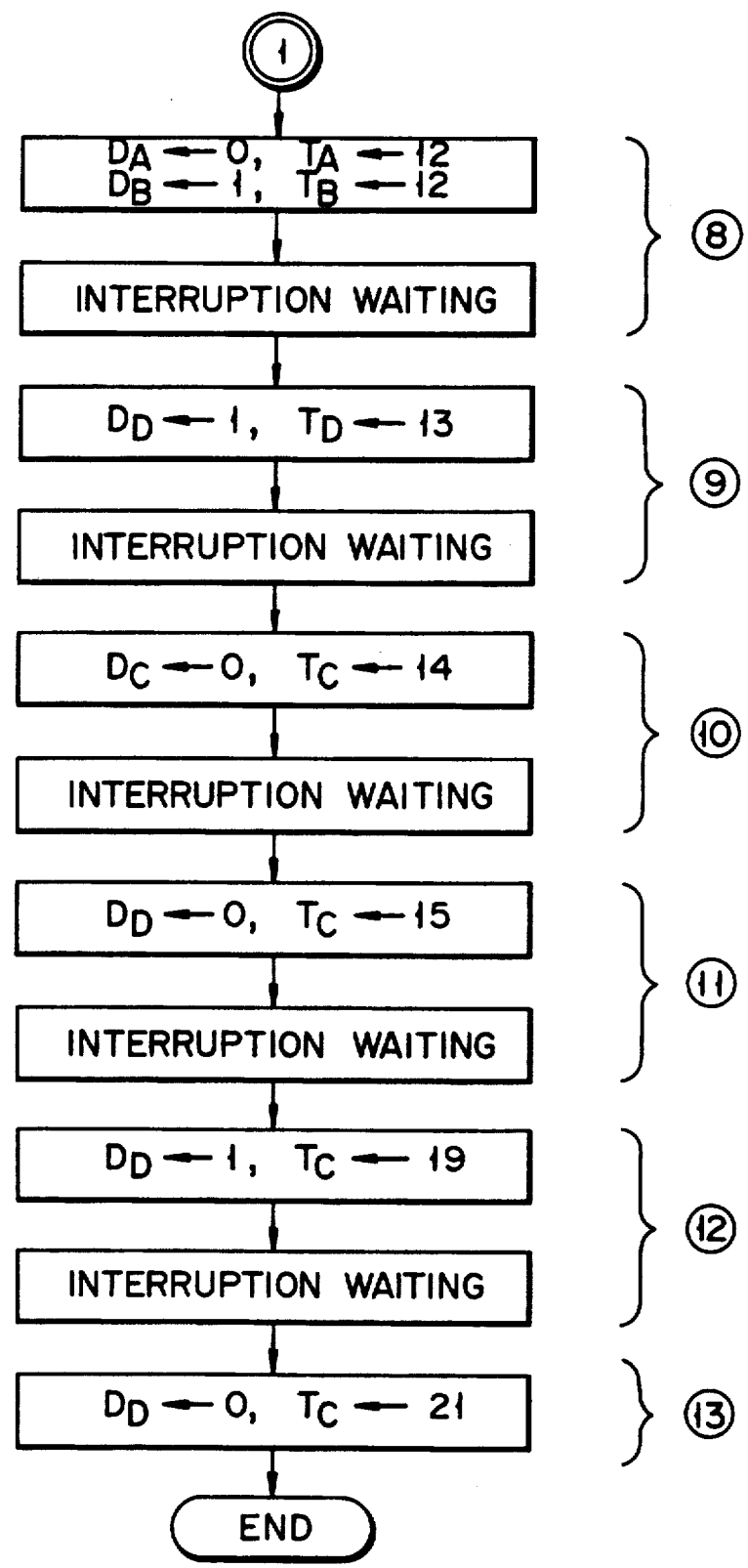
Figure 4A:
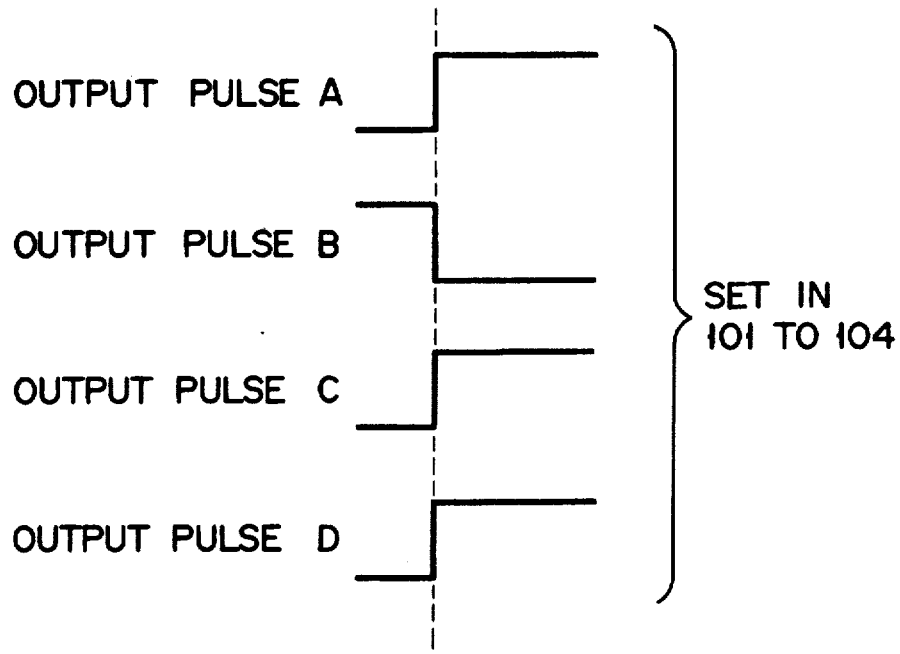
FIGS. 4A and 4B are timing charts for explaining the problems to be solved in the prior art output pulse generating apparatus.
Figure 4B:
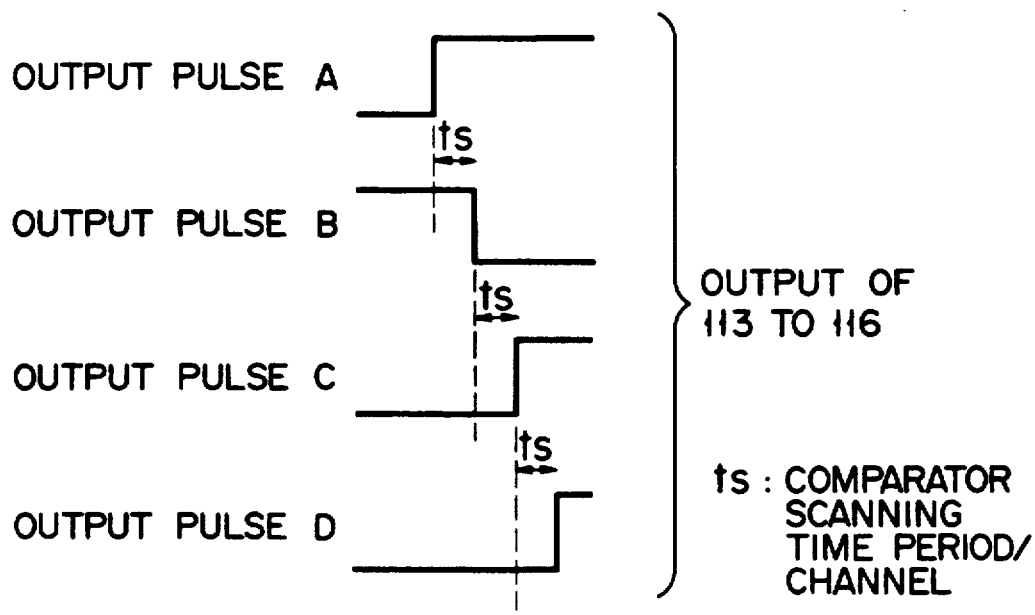
Figure 6:
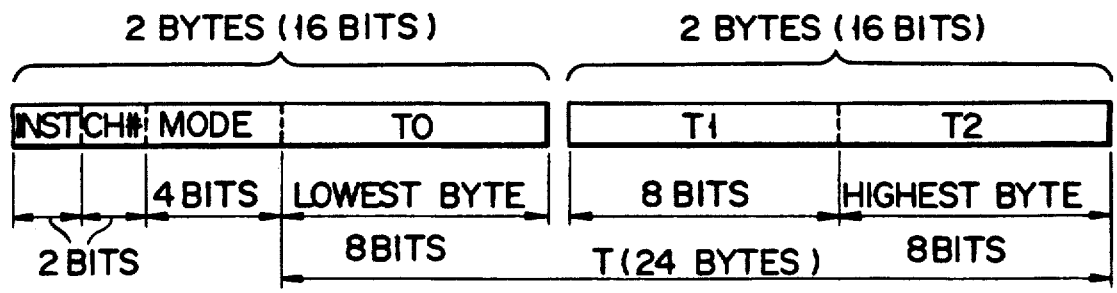
FIG. 6 is a view for explaining a format of a command to be, stored in a command memory.

As shown in FIG. 6, each command stored in command memory 4 includes 2 words (1 word corresponds to 2 bytes), a total of 32 bits. Each command has an INST section (2 bits), a CH# section (2 bits), a MODE section (4 bits), and a time point section (24 bits) from the lower bits. The T section is divided into a T0 section (8 bits, the least significant byte), a T1 section (8 bits), and a T2 section (8 bits, the most significant byte). The INST section represents a code for identifying each command. The CH# section represents a code for specifying one of four channels (for generating output pulses A, B, C, and D, for example, as shown in FIG. 2). In this case, when a command having no relationship with the channels is processed, a command code may be described across the INST and CH# sections. The MODE section represents a code for indicating an output value or output state of a specified channel. The T section represents a code for designating a time point at which an output value of a pulse is changed. For example, as shown in FIGS. 7A to 7G, seven types of commands are prepared. The functions of the commands will be described below.

FIG. 7A, NOP command

The NOP command is generated when INST section=00 and CH# section=00. The command causes no change in output value of a pulse, and is used to fill a vacant storing region of command memory 4. In this command, the MODE and T sections are neglected.

FIG. 7B, TRANS command

The TRANS command is generated when INST section=01. This command causes pulses of all the channels to produce an output state change designated by the MODE section at a time point designated by the T section.

When the command is executed, sequencer 5 rewrites 00 in the INST and CH# sections to generate the NOP command.

FIG. 7C, TRANS. ALL command

The TRANS. ALL command is generated when INST section=00 and CH# section=01. This command causes pulses of all the channels to produce an output state change designated by the MODE section at a time point designated by the T section. When the command is executed, sequencer 5 rewrites 00 in INST and CH# sections to generate the NOP command.

FIG. 7D, TRANSADD command

The TRANSADD command is generated when INST section = 10. This command causes a pulse of a channel designated by the CH# section to produce a state change designated by the MODE section at a time point designated by the T section. In addition, the command serves to add a time interval stored in a designated register of registers for storing time intervals between periodic pulses, which will be described later with reference to FIG. 11, to a time point designated by the T section and rewrite the adding result as a new set time point in the T section. Such a command is suitable for description of a periodic pulse because it can cause a pulse to repeatedly produce the same change.

FIG. 7E, TRANSADD. ALL command

The TRANSADD. ALL command is generated when INST section=00 and CH# section=10. This command causes pulses of all the channels to produce a state change designated by the MODE code at a time point designated by the T section. In addition, the command serves to add an time interval stored in a designated one of the registers for storing time intervals (between pulses), which will be described later, to a time point designated by the T section, and rewrite the adding result as a new time point in the T section. Similar to the TRANSADD command, this command is suitable for description of a periodic pulse because it can cause a pulse to repeatedly produce the same change.

FIG. 7F, LOADITV command

The LOADITV command is generated when INST section =11. This command is used to write time intervals, which are necessary for generation of periodic pulses designated by the T section, into the registers in sequencer 5. 16 pairs of the registers are arranged to store the time intervals. One of the 16 register pairs is designated by data in the MODE section. In this command, the description in the CH# section is neglected.

FIG. 7G, SELITV command

The SELITV command is generated when INST section=00 and CH# section=11. This command is used to select a register pair designated by the MODE section from the 16 register pairs for storing time intervals necessary for generation of periodic pulses. In this command, the description in the T section is neglected.

FIG. 8 shows an example wherein the states of output pulses A to D in FIG. 2 are described using the above-described commands.

Referring to FIG. 8, the description of (1) is for outputting output values "0" at time point "0" from four channels corresponding to output pulses A, B, C, and D. The description of (2) is for outputting output values "1" and "0" at time points 4 and 12, respectively, from channel A. The description of (3) is for outputting output value "1" at time point 12 from channel B. The description of (4) is for outputting output value "1" at time point 4 from channel C, inverting output value "1" into "0" and outputting "1" at time point 9, inverting output value "0" and outputting output value "1" at time point 11, and outputting output value "0" at time point 14. The description of (5) is for setting a time interval of periodic pulses in on register pair designated by R0 of the 16 register pairs, outputting output value "1" at time point 1 from channel D, adding time interval 6 to time point 1 to rewrite adding result 7 as a new time point in the T section, and outputting output value "0" at time point 3, adding time interval 6 to time point 3 to rewrite adding result 9 as a new time point in the T section. The description of (6) is for describing a command for unchanged state of a pulse in a vacant storing region of command memory 4. Pulses A to D in FIG. 2 can be designated using the above-described commands.

Figure 9:
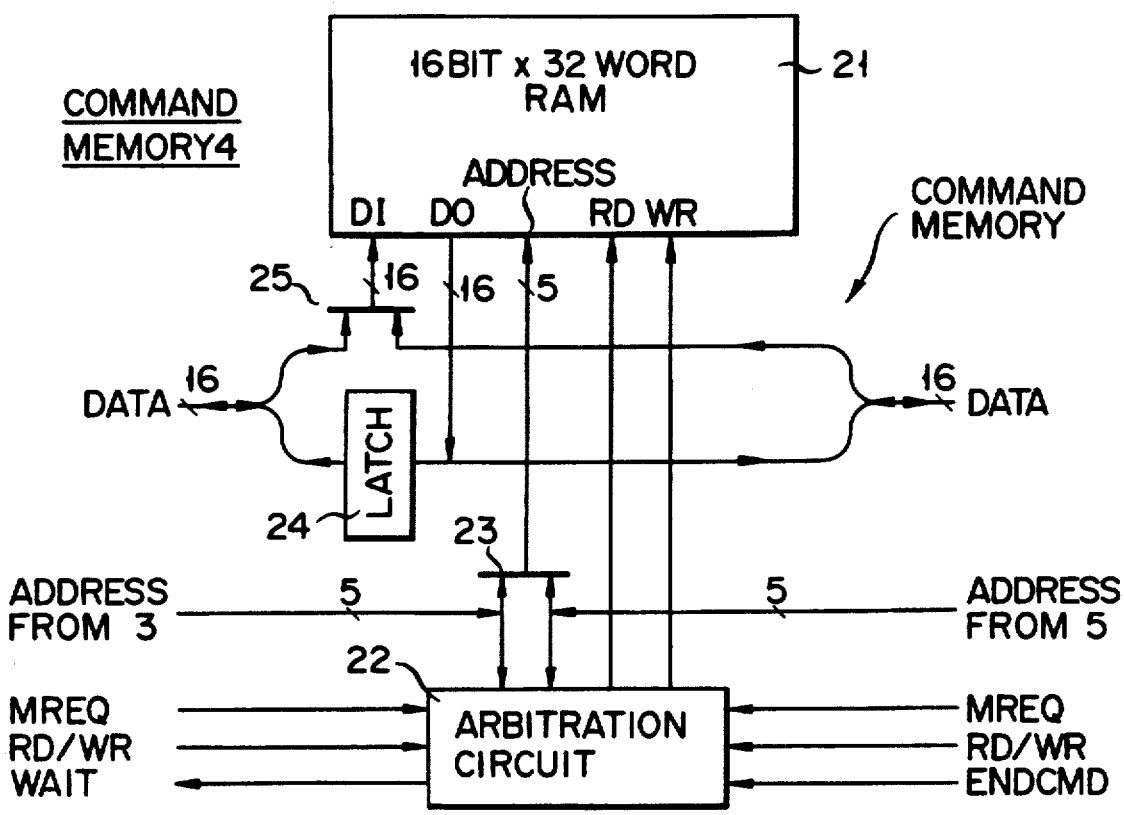
FIG. 9 is a block diagram showing an arrangement of the command memory in FIG. 5.

FIG. 9 shows an arrangement of command memory 4 for storing the commands in detail. Referring to FIG. 9, RAM 21 having a capacity of 16 bits×32 words can store 16 commands Since RAM 21 is accessed by both CPU 3 and sequencer 5, arbitration circuit 22 is arranged to mediate use requests from them. Switch 23 switches addresses of RAM 21 from CPU 3 and sequencer 5 in accordance with an output from arbitration circuit 22.

In this embodiment, a time required for read and write operations with respect to command memory 4 is set to equal to a cycle time of system clock SCK for defining an operation of sequencer 5. A time required for read and write operations with respect to CPU 3 is set at three times the cycle time of system clock SCK.

Figure 10:
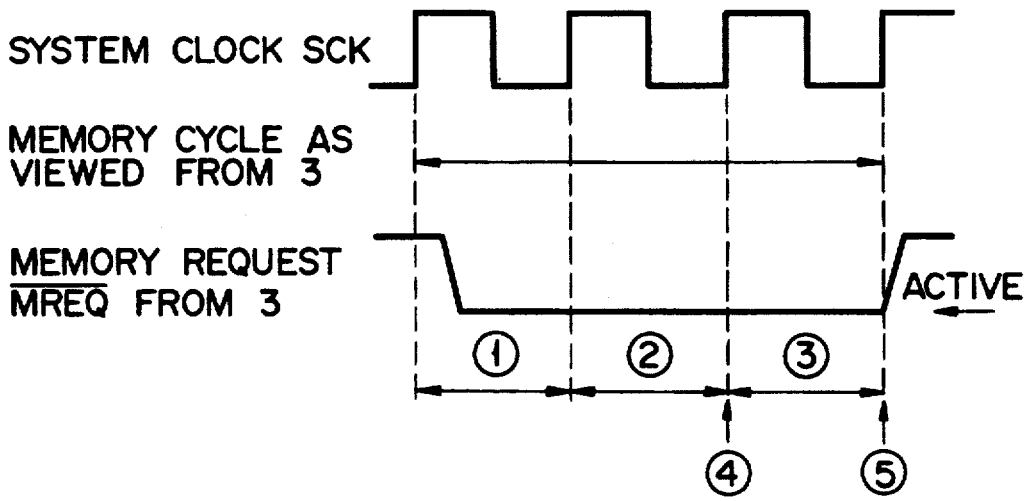
FIG. 10 is a timing chart showing a relationship between a system clock and an access timing with respect to a CPU (FIG. 5)

However, when CPU 3 reads or writes data from or in command memory 4, since $\overline{MREQ}$ signal (a request signal from CPU 3 to command memory 4) is not effective at a first clock of system clock SCK, as shown in FIG. 10, an address of command memory 4 is not specified. In addition, sequence 5 is set so that it does not use RAM 21 during successive two clocks of system clock SCK.

Arbitration circuit 22 executes arbitration on the above sequence 5 as follows. An access request from sequencer 5 to command memory 4 has priority over that from CPU 3. In interval (1) in FIG. 10, an address request from CPU 3 to command memory 4 is not specified, and only sequencer 5 can use RAM 21 in command memory 4.

In intervals (2) and (3), both CPU 3 and sequencer 5 can use RAM 21. When sequencer 5 does not generate a use request of RAM 21 in interval (2), CPU 3 can use RAM 21 in interval (2), and readout data can be obtained at a time point indicated by (4). When sequencer 5 does not generate a use request of RAM 21 in interval (3), CPU 3 can use RAM 21 in this interval, and readout data can be obtained at time point (5). Therefore, CPU 3 can obtain output data from command memory 4 at one of intervals (4) and (5). For this purpose, latch 24 must be connected to terminal DO of CPU 3 side to store data read out from RAM 21.

Since sequencer 5 does not successively output use requests of RAM 21, when sequencer 5 generates a use request in intervals (1) and (3), CPU 3 can use RAM 21 in interval (2). When sequencer 5 generates a use request in interval (2), CPU 3 can use RAM 21 in intervals (1) and (2). Note that when CPU 3 and sequencer 5 request the same address of RAM 21, an address of command which sequencer 5 is executing and an address which CPU 3 requests are the same. Therefore, in order to prevent a disturbance in execution of the command by sequencer 5, and prevent CPU 3 from reading out an incomplete value from RAM 21, CPU 3 is set in a wait state for a use request of RAM 21 until sequencer 5 completes the execution of the command.

Upon arbitration described above, wait times for use requests of RAM 21 from CPU 3 and sequencer 5 can be minimized.

Figure 11:
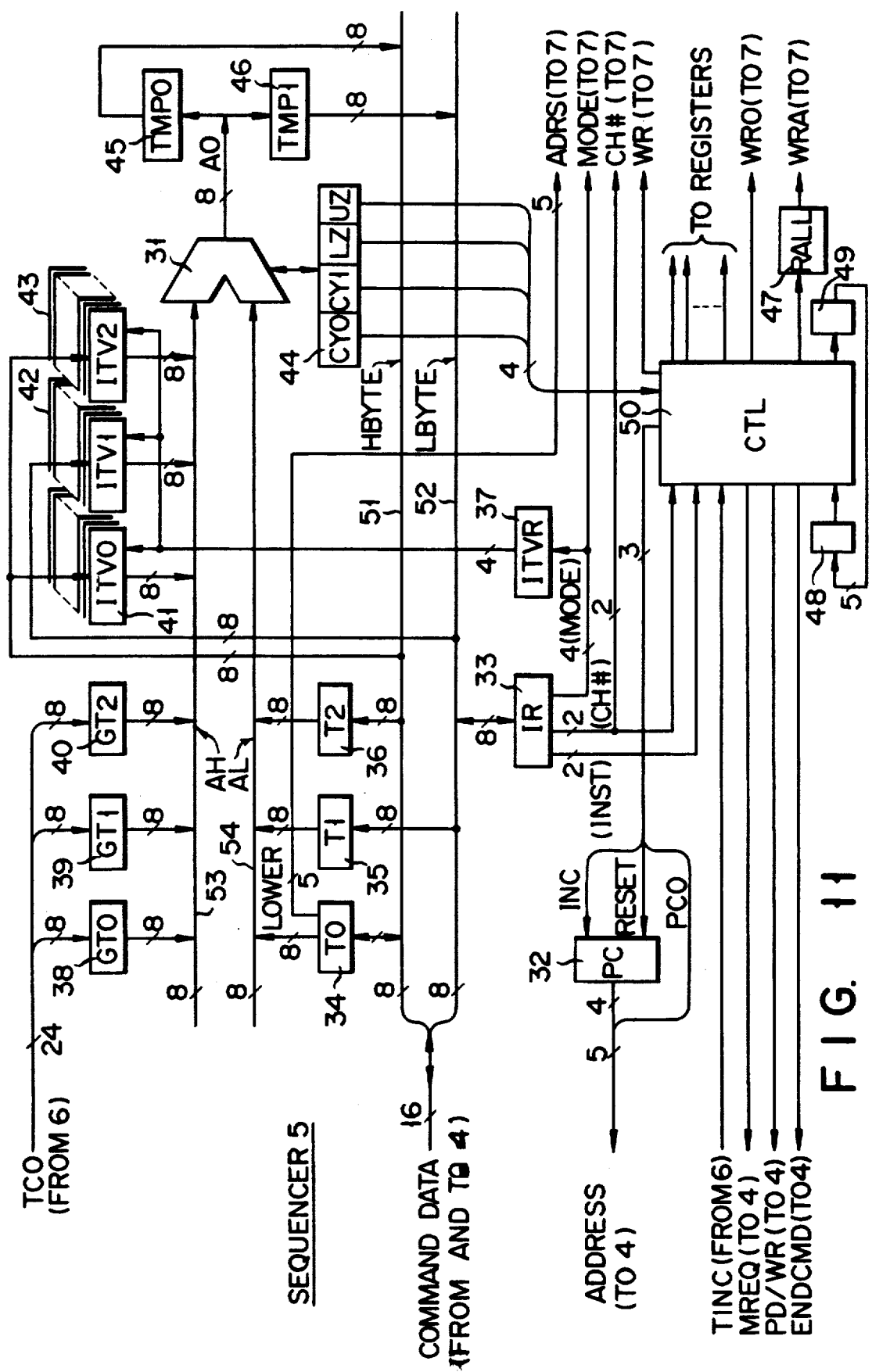
FIG. 11 is a block diagram showing a sequencer of FIG. 5 in detail.

Sequencer 5 will be described below. As shown in FIG. 11, sequencer 5 comprises 8-bit adder/subtracter 31, program counter (P.C) 32 for generating addresses of command memory 4, various types of registers (R.Gs) 33 to 49, and controller (CTL) 50 for controlling adder/subtracter 31, P.C 32, and R.Gs 33 to 49.

Program counter 32 comprises a 4-bit counter. Since command memory 4 (FIG. 9) has a capacity of 32 words, 5 bits are required to designate an address of command memory 4. Therefore, the PCO signal from controller 50 is used as the LSB of the 5 bits. Program counter 32 is incremented and reset in response to the INC and RESET signals from controller 50, respectively.

A command from command memory 4 is supplied to sequencer 5 through a 16-bit data bus. Since this command is executed in units of 8 bits by sequencer 5, the data bus is separated into upper byte bus (HBYTE BUS) 51 and lower byte bus (LBYTE) 52.

One byte of the command input from command memory 4 through byte bus 52, i.e., the INST section, the CH# section, and the MODE section, is stored in 8-bit IR register 33. The INST and CH# sections stored in IR register 33 are supplied to controller 50. Subsequently, controller 50 decodes the command from the INST and CH# sections to perform necessary control. IR register 33 is designed such that the INST and CH# sections can be rewritten as "00", i.e., the contents in command memory 4 can be rewritten.

The least and most significant bytes T0 and T2 of the T section of the command input from command memory 4 through upper byte bus 51 are respectively stored in T0 and T2 registers 34 and 35. Middle byte T1 is stored in T1 register 35. Outputs from registers 34 to 36 are supplied to one input terminal of adder/subtracter 31 through AL bus 54 in units of 8 bits. On the other hand, 24-bit data of reference time point TC0 is stored in units of 8 bits in GT0, GT1, GT2 registers 38, 39, and 40, respectively. Registers 38 to 40 are used to store output values from timer counter 6 because a disturbance occurs if outputs from timer counter 6 vary during execution of a command by sequencer 5. Outputs from registers 38 to 40 are supplied to the other input terminal of adder/subtracter 31 in units of 8 bits through AH bus 53. Outputs from ITV0, ITV1, and ITV2 registers 41, 42, and 43 may be supplied in units of 8 bits through AH bus 53. Register groups 41 to 43 store data indicating time intervals of cycle periods input through buses 51 and 52. Each of register groups 41, 42, and 43 includes 16 registers. The 4-bit MODE section stored in IR register 33 is stored in 4-bit ITVR register 37. One of registers groups 41 to 43 each having 16 registers is selected by the MODE section stored in register 37.

Adder/subtracter 31 performs a calculation of an output on AL bus 54+an output on AH bus 53 or an output on AL bus 54−an output on AH bus 53. In order to perform addition/subtraction of 24 bits using 8-bit add/substracter 31, 4-bit flag register 44 is arranged to store carrier flag CY0 for subtraction, carrier flag CY1 for addition, the LZ flag to be set when the lower 5 bits of data obtained from addition/subtraction is "0", and the UZ flag to be set when the upper 3 bits of data obtained from addition/subtraction is "0". Each flag stored in flag register 44 is supplied to controller 50.

Data of operation result from adder/subtracter 31 is stored in 8-bit TMP0 and 8-bit TMP1 registers 45 and 46. Outputs from TMP0 and TMP1 registers 45 and 46 are respectively output onto upper and lower byte buses 51 and 52.

Controller 50 controls sequencer 5 and includes, e.g., a PLA (Programmable Logic Array). Controller 50 includes a feedback path through 5-bit registers 48 and 49, thereby constituting the sequencer. The INST and CH# signals from IR register 33, the various flags from flag register 44, and renewed time point signal TINC are supplied to controller 50. With respect to command memory 4, controller 50 outputs the INC. RESET, and PCO signals for designating an address in command memory 4, the $\overline{\text{MREQ}}$ signal representing an access request to RAM 21, the RD/WR signal designating read/write to RAM 21, and the ENDCMD signal representing an end of command execution. With respect to output memory 7, controller 50 outputs the WR signal representing a write command to a designated channel, the WRA signal, set in RALL register 47, for requesting a single value to be written in all the channels, and the WR0 signal requesting "0" to be written in all the channels.

The lower 5 bits of T0 register 34 connected to upper byte bus 51 is output to output memory 7 as the ADRS signal for designating an address in output memory 7. The contents in the CH# and MODE sections of the least significant byte of a command stored in IR register 33 are supplied to output memory 7 as a channel designating signal and write data, respectively.

FIGS. 12A to 12D are flow charts showing an operation of sequencer 5 arranged in the above-described manner. According to the flow chart in FIG. 12A, sequencer 5 reads a first word of a command from command memory 4, recognizes a type of the command from the INST section of the first word, and the flow branches to an execution section of this command.

In order to designate an address in command memory 4, the PCO signal output from controller 50 is set to "0", the first word of the command is read into IR and T0 registers 33 and 34 of sequencer 5, respectively, and RALL register 47 is reset. At the same time, an output value (reference time point) from timer counter 6 is read into GT0, GT1, and GT2 registers 38, 39, and 40 (Step ①).

Then, values (data) in the INST and CH# sections of IR register 33 are checked, and the flow branches to an execution section of each command (Step ②).

Sequencer 5 executes the TRANS command when INST section="0", the TRANSADD command when "10", and the LOADITV command when "11", respectively.

When the TRANS command is determined, and the difference between a reference time point stored in GT0, GT1, and GT2 registers 38, 39, and 40 and supplied from timer counter 6, and a set time point of the command stored in T0, T1, and T2 registers 34, 35, and 36 falls below 32 words of each channel of output memory 7, data of the TRANS command is written in output memory 7. Since 24-bit data is processed by 8-bit adder/subtracter 31, 24 bits are processed in units of bytes three times (Step ② in FIG. 12A, Steps ① and ③ in FIG. 12B). In this operation, the values of the UZ and LZ flags are checked in each 1-byte operation. When it is determined from the values of these flags that the difference between the reference time point and the set time point is 32 words or more, program counter 32 is incremented and the execution of the command is ended (Step ⑤ in FIG. 12B). When it is determined that the difference between the reference time point and the set time point of the command is below 32 words, the PCO signal is reset to "0", the INST and CH# sections are respectively rewritten as "0" to generate the NOP command, and the contents of T0 and IR registers 34 and 33 are rewritten by the first word of the NOP command. At the same time, the CH# and MODE sections of IR register 33, and the contents of the lower 5 bits of T0 register 34 and RALL register 47 are output to output memory 7. Subsequently, program counter 32 is incremented, and the execution of the command is completed (Step ④ and ⑤ in FIG. 12B).

When sequencer 5 reads out TRANSADD command, an operation similar to that for the TRANS command is performed. More specifically, when it is determined from the values of the UZ and LZ flags upon 1-byte operation in adder/subtracter 31 that the value obtained by subtracting the reference time point output from timer counter 6 from the set time point of the command is below 32 words of each channel of output memory 7, program counter 32 is incremented and the execution of the command is completed (Step ②) in FIG. 12A, Steps ① to ④ and ⑦ in FIG. 12C). Note that in Step ① in FIG. 12C for determining the value of the UZ flag upon operation of T0 - GT0, the contents of T0 and ITV0 registers 34 and 41 are added together, and the adding result is written in TMP0 register 45.

When the difference between the set time point and the reference time point is below 32 words, the PCO signal is reset to "0", and the contents of IR and TMP0 registers 33 and 45 are set to a first word of the command. Upon rewrite of the first word, the T0 section of the command is updated. Then, the contents of T1 and ITV1 registers 35 and 42, and the value of the CY1 flag are added together, and the adding result is stored in TMP1 register 46. At the same time, the contents of the CH# and MODE sections of IR register 33, the lower 5 bits of the contents of T0 register, and the contents of RALL register 47 are output to output memory 7 (Step ④ in FIG. 12C). In addition, the contents of T2 and ITV2 registers 36 and 43, and the CY1 flag are added together, and the resultant data is stored in TMP0 register 45 (Step ⑤ in FIG. 12C). Then, the PCO signal is set to "1", and the contents of TMP0 and TMP1 registers 45 and 46 are respectively written in the T2 and T1 sections of a second word of the command (Step ⑥ in FIG. 12C). Finally, program counter 32 is incremented and the execution of the command is completed (Step ⑦ in FIG. 12C).

When the LOADITV command is to be executed, as shown in FIG. 12A, the mode section of a command stored in IR register 33 and the T0 section stored in T0 register 34 are respectively stored in ITVR and ITV0 registers 37 and 41 (Step ② in FIG. 12A). Then, as shown in FIG. 12D, the PCO signal is set to "1", and the contents of the T1 and T2 sections of the command is read into ITV1 and ITV2 registers 42 and 43, respectively (Step ① in FIG. 12D). Subsequently, program counter 32 is incremented and the execution of the command is completed (Step ② in FIG. 12D).

Figure 12B:
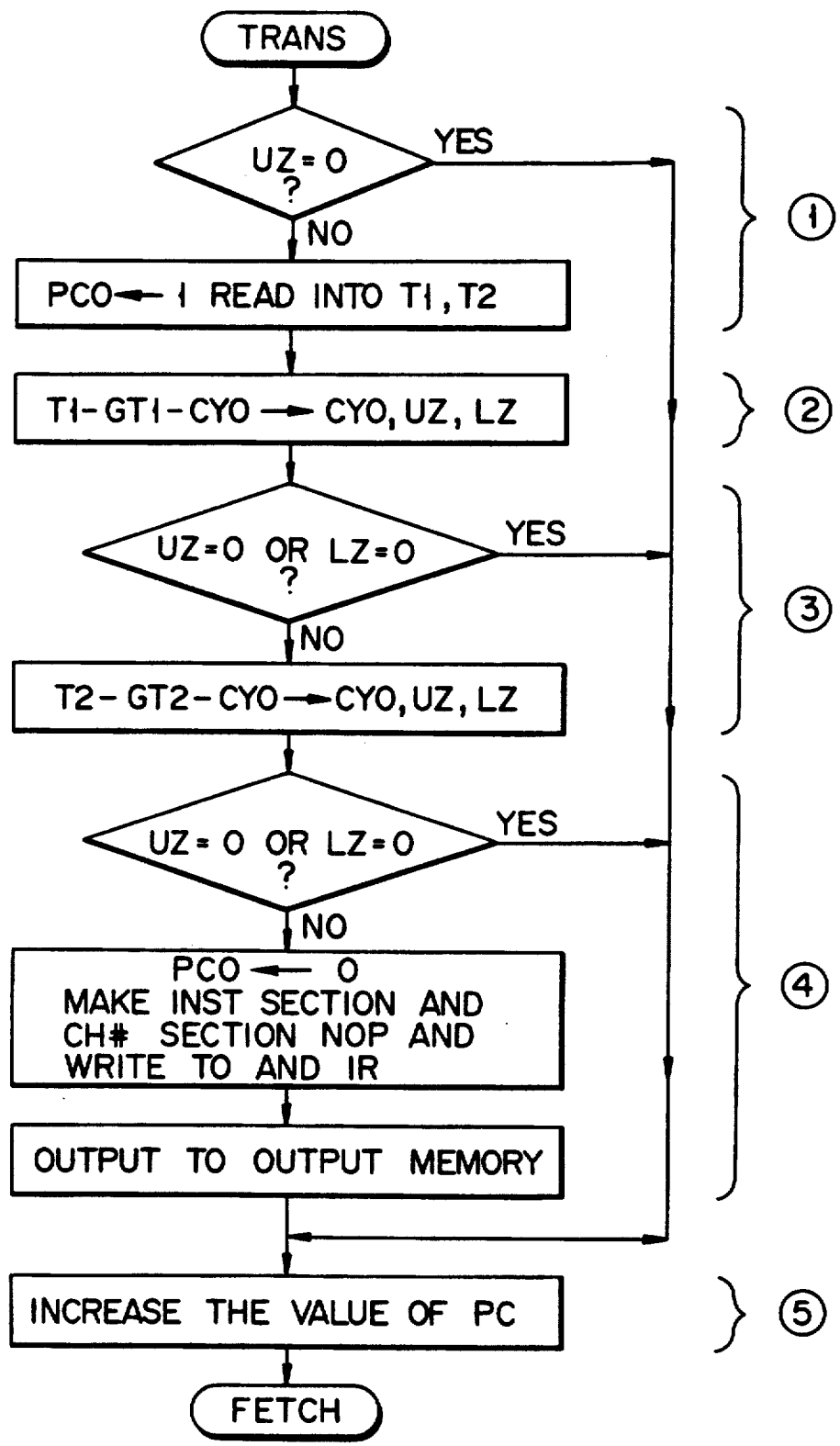
Figure 12C:
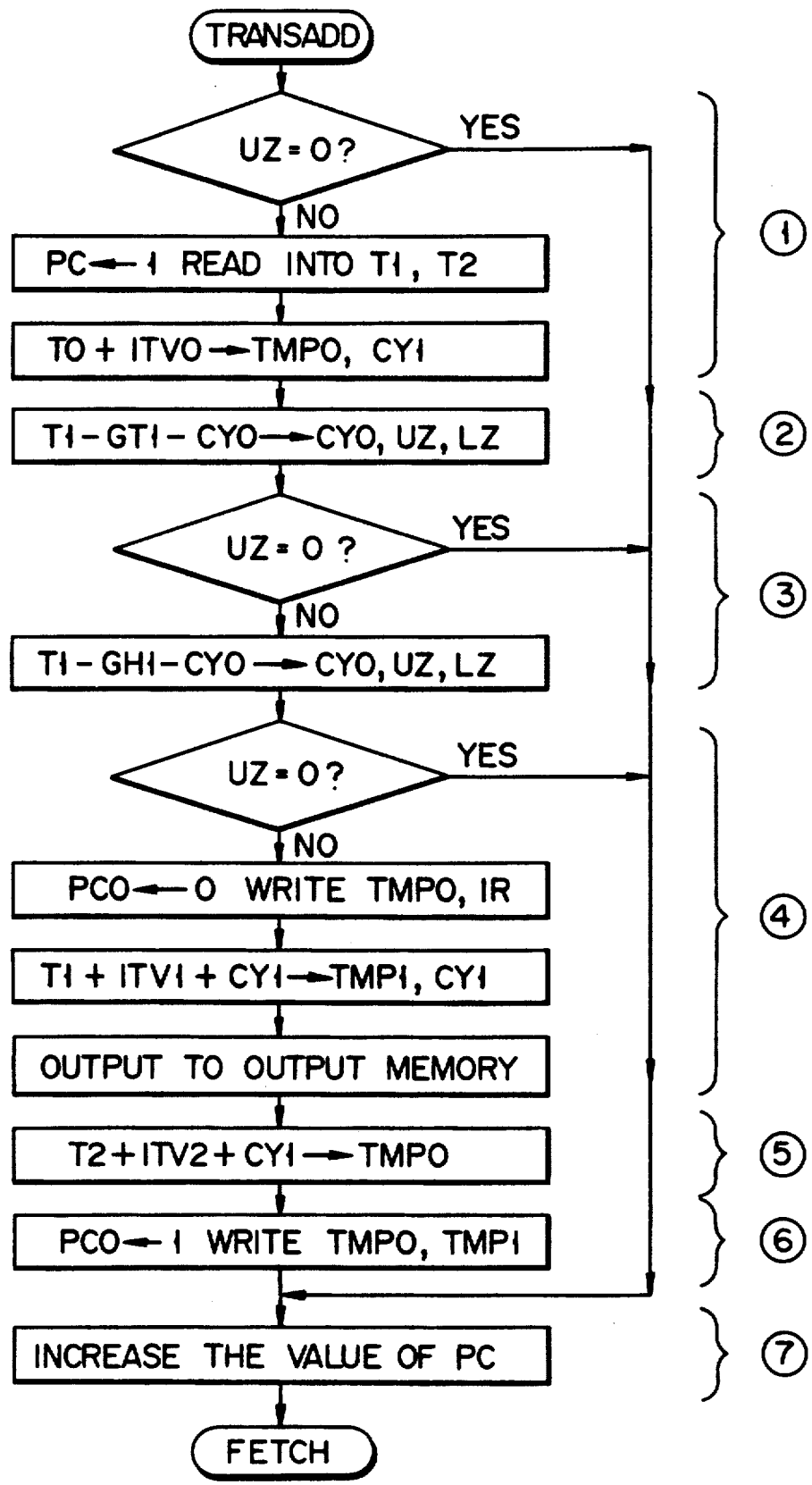
Figure 12D:
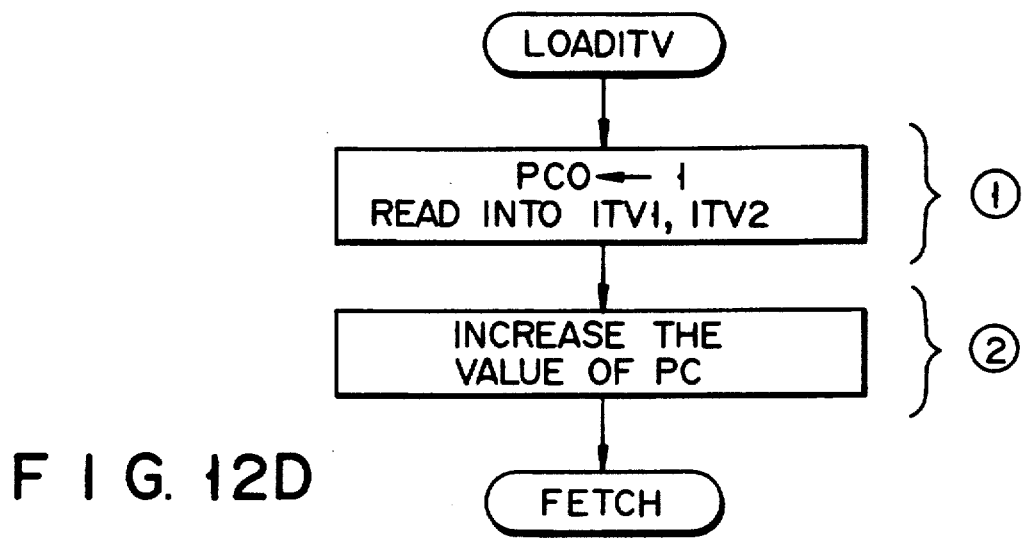

In the flow charts in FIGS. 12A to 12D, processes indicated by the same circled number are performed during one clock period of system clock SCK (FIG. 10). Therefore, in execution of the TRANSADD command requiring the longest process time, a maximum of 9 clocks are required (FIGS. 12A and 12C). Therefore, when 16 TRANSADD commands are described in command memory 4, a maximum of 16×9=144 SCK clocks are required to execute all 16 commands. When the TINC signal representing that the contents of timer counter 6 are updated is supplied to controller 50, sequencer 5 stops execution of the command during the 2-SCK clock period. During this period, output memory 7 outputs a pulse output value of an address in output memory 7 corresponding to the updated reference time point.

Figure 13:
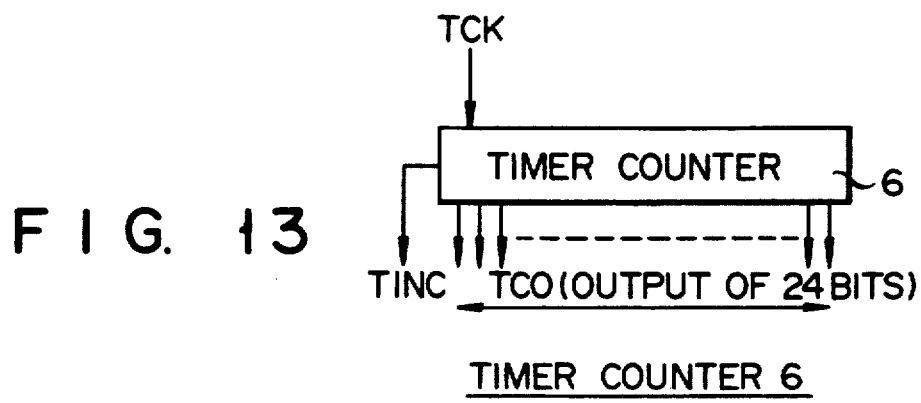
FIG. 13 is a block diagram of a timer counter in FIG. 5.

FIG. 13 shows an arrangement of timer counter 6. Timer counter 6 has a length of 24 bits. The output of timer counter 6 is updated by timer clock TCK generated at predetermined time intervals, and timer counter 6 outputs 24-bit reference time point data and the TINC signal representing that the time point is being updated.

Figure 14:
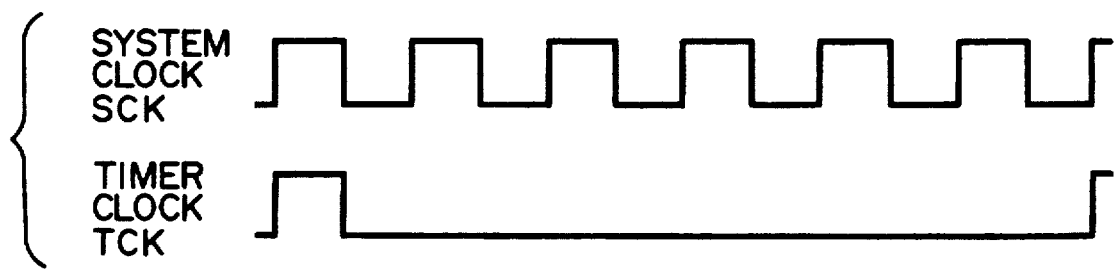
FIG. 14 is a timing chart showing a relationship between a system clock and a timer clock.

In this embodiment, as shown in FIG. 14, the ratio between a cycle period of timer clock TCK and that of system clock SCK is set to be 6:1. For this reason, 32 words×6=192 SCK clocks are required to send forth all the pulse output values stored in output memory 7 to output circuit 8.

The operation time duration of sequencer is 144 at maximum, as described above. Since during this 144-SCK clock period the output of timer counter 6 is updated 144÷6=24 times, sequencer 5 stops scanning command memory 5 during a period corresponding to 24×2=48 SCK clocks. Therefore, in order to execute all the commands stored in command memory 4, a maximum of 192-SCK clock period is sufficient. This satisfies a time corresponding to 192 SCK clocks required for sending the pulse output values from output memory 7 to output circuit 8, as described above.

Figure 15:
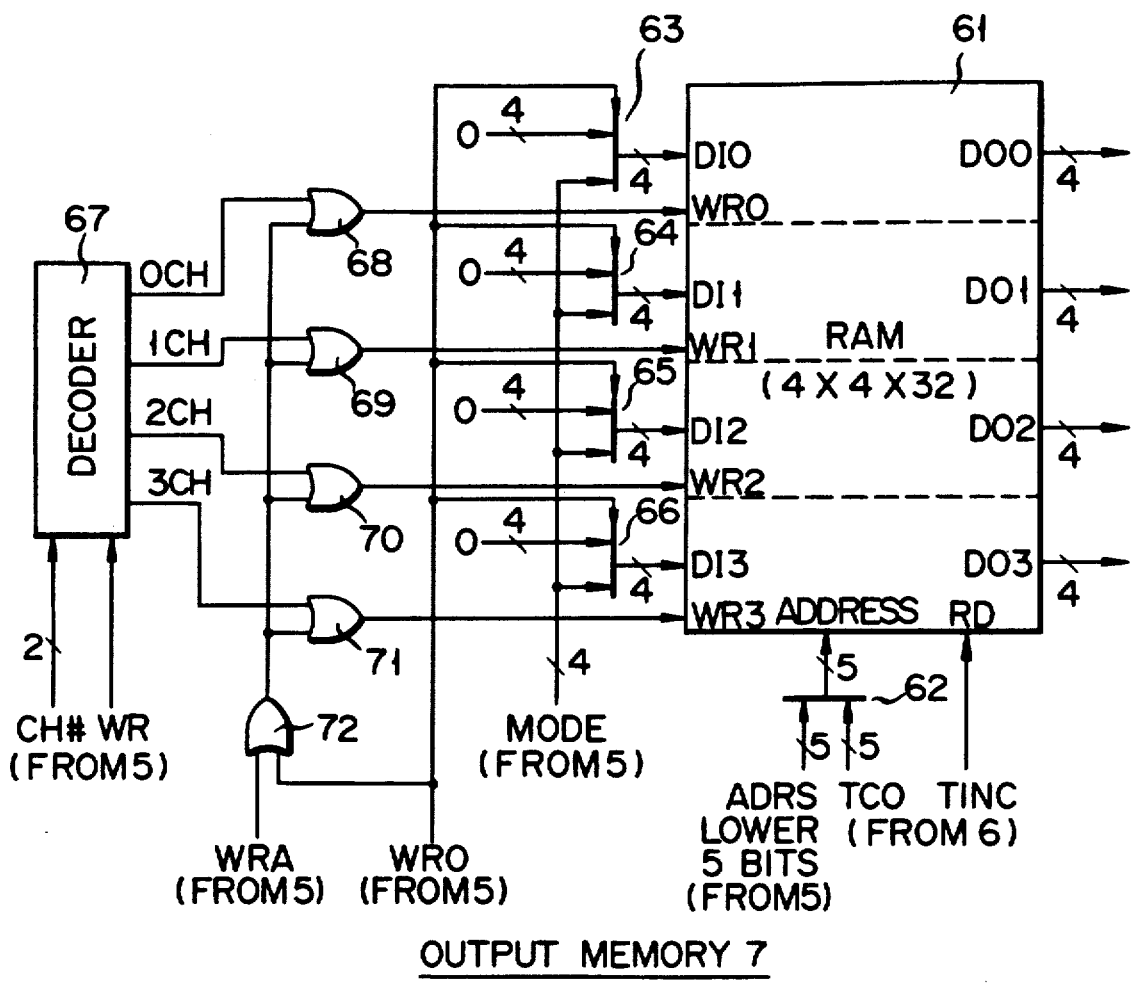
FIG. 15 is a block diagram showing an output memory of FIG. 5 in detail.

FIG. 15 shows an arrangement of output memory 7 in detail. Referring to FIG. 15, RAM 61 has a capacity of 16 bits 32 words for each channel. RAM 61 is divided in units of 34 bits so that the 16-bit data can correspond to the MODE data of a command, i.e., 4 channels. Data is read out from output memory 7 in units of 16 bits. However, RAM 61 is designed such that the write operation can be performed in units of channels.

The address input of RAM 61 receives one of the ADRS signal from sequencer 5 and the lower 5 bits of the TCO signal (reference time point signal) from timer counter 6 through selector 62. Outputs from 4-bit selectors 63 to 66 are supplied to data inputs D10 to D13 of RAM 61.

Data "0" is supplied to one input of each of selectors 63 to 66, and the 4-bit MODE code output from sequencer 5 is supplied to its other input. One of the MODE code and WR0 signal is selectively output from selectors 63 to 66 in accordance with the value of the WR0 signal (signal requiring "0" to be written in all the channels), output from sequencer 5, for designating all clear.

Decoder 67 decodes the CH# code output from sequencer 5 and sets the output of a channel corresponding to the decoded result at "1" level in synchronism with the WR signal (a command signal for writing data in a designated channel) output from sequencer 5. An output from each of channels 0CH to 3CH is supplied to one input of each of 4 OR circuits 68 to 71. An output from OR 72 is supplied to the other input of each of OR circuits 68 to 71. When one of the WRA signal (a command signal for writing the same value in all the channels) output from sequencer 5 and the WR0 signal (a command signal for writing "0" in all the channels) is set to "1", OR circuit 72 sets all the outputs from OR circuits 68 to 71 to "0" to write data in all the channels of RAM 61. Outputs from OR circuits 68 to 71 are supplied to RAM 61 as write signals WR0 to WR3 for writing data in RAM 61. A renewed time point signal, i.e., the TINC signal is supplied from timer counter 6 to terminal RD as a read signal to RAM 61 so that the read operation is synchronized with the renewed time point of timer counter 6.

According to the above arrangement of output memory 7, when data is written in RAM 61, sequencer 5 supplies the ADRS signal (the lower five bits of the T0 register) to RAM 61 as an address. When the TRANS and TRANSADD commands are executed by sequencer 5, the WRA and WR0 signals supplied from sequencer 5 to output memory 7 are disabled, and the MODE code is written in only a channel designated by the CH# code. When the TRANS. ALL and TRANSADD. ALL command are to be executed, the WRA signal is enabled, and the same MODE code is written in all the channels of output memory 7. Sequencer 5 writes data in RAM 61 when the difference between a time point designated by each command and a reference time point from timer counter 6 falls below 32 words of each channel of RAM 61 during execution of the TRANS, TRANS. ALL, TRANSADD, and TRANSADD. ALL commands.

When data is to be read out from RAM 61, the lower 5 bits of the TC0 signal (FIG. 13) from timer counter 6 are supplied to RAM 61 as an address. A readout timing is determined by the TINC signal serving as a renewed time point signal from timer counter 6. When a read operation is performed, since pieces of data from all the channels are simultaneously read out, no difference occurs between readout time points of the channels. After the data is read out from RAM 61, the WR0 signal (a command signal for writing "0" in all the channels) from sequencer 5 is enabled. Consequently, selectors 63 to 66 select input "0", and the WR0 to WR3 signals for writing "0" are simultaneously supplied to all the channels of RAM 61, thereby writing "0" in all the channels of RAM 61. Thus, the same data is not read out from RAM 61 after the output of timer counter 6 is updated 32 times.

Figure 16:
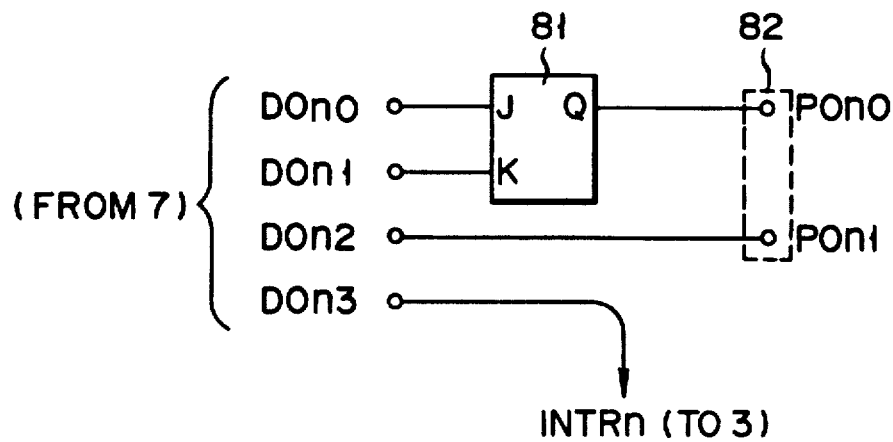
FIG. 16 is a block diagram showing an output circuit of FIG. 5 in detail.

FIG. 16 shows output circuit 8 in detail. FIG. 16 shows a circuit with respect to a single channel. The four circuits in FIG. 16 constitute output circuit 8 having four channels. Lower 2 bits, i.e., DOn0 and DOn1 of 4 bits, i.e., DOn0, DOn1, DOn2, and DOn3 of data (constituting the MODE code) read out from RAM 61 through an nth channel are respectively supplied to the J and K terminals of JK flip-flop 81. The Q output of JK flip-flop 81 is connected to first terminal POn0 of output terminal 82, and bit DOn2 is supplied to second terminal POn1 of output terminal 82. In addition, MSB DOn3 of the MODE code is supplied to CPU 3 as interrupt signal INTRn.

According to the above-described arrangement, the output value from output circuit 8 varies in accordance with a description of the MODE section of a command, as shown in the following Table.

TABLE

| MODE CODE | DATA ON 1ST TERMINAL POn1 | DATA ON 2ND TERMINAL POn1 | INTERRUPTION TO CPU INTRn |
| --- | --- | --- | --- |
| 0000 | NOT CHANGED | 0 | 0 |
| 0001 | 0 | 0 | 0 |
| 0010 | 1 | 0 | 0 |
| 0011 | INVERTED | 0 | 0 |
| 0100 | NOT CHANGED | 1 | 1 |
| 0101 | 0 | 1 | 0 |
| 0110 | 1 | 1 | 0 |
| 0111 | INVERTED | 1 | 0 |
| 1000 | NOT CHANGED | 0 | 1 |
| 1001 | 0 | 0 | 1 |
| 1010 | 1 | 0 | 1 |
| 1011 | INVERTED | 0 | 1 |
| 1100 | NOT CHANGED | 1 | 1 |
| 1101 | 0 | 1 | 1 |
| 1110 | 1 | 1 | 1 |
| 1111 | INVERTED | 1 | 1 |

As shown in the above Table, output states of a pulse or pulses output from output circuit 8 can be variously changed in accordance with a description of the MODE section of a command.

What is claimed is:

1. A pulse generating apparatus comprising:
a central processor unit which outputs a command including a time point at which a pulse is generated and a output value at the time point;
a command memory coupled to said central processor unit, for storing commands each of which is output from said processor unit; a time counter for producing a reference time signal denoting a reference time point;
a sequencer coupled to said command memory and said timer counter;
an output memory coupled to said timer counter and said sequencer, for storing said output value of said pulse at said time point by being accessed by said sequencer; and
an output circuit coupled to said central processor unit and said output memory, for reading said output value of said pulse from an address of said output memory corresponding to said reference time point and forming said pulse from said output value read out from said output memory; wherein
said sequencer sequentially reads out the commands stored in said command memory and, when a time difference between the time point included in one of the commands which is read out from said command memory and the reference time point denoted by the reference time point signal input from said time counter is less than a time duration predetermined by the memory capacity of said output memory, said sequencer writes into said output memory the output value read out from said executed command updates the time point set in the command and writes the update time point into said command memory.

2. A pulse generating apparatus according to claim 1, wherein said sequencer comprises:
means for clearing storage regions of said output memory from which predetermined data have been read out and, when the time difference is less than the time duration, said sequencer executes the command.

3. A pulse generating apparatus according to claim 1, wherein
said command comprises a first command designating a time interval specifying a pulse period of a periodic pulse and a second command designating a first time point at which a first periodic pulse is output; and
said sequencer comprises means for adding said time interval to said first time point and for rewriting said command by said adding result to form a second time point at which a second periodic pulse, succeeding said first periodic pulse, is output.

4. A pulse generating apparatus according to claim 3, wherein
said sequencer comprises a plurality of registers for storing said time intervals; and
said command stored in said command memory comprises a third command for storing an individual time interval in each of said registers and a fourth command for selecting one of said time intervals.

5. A pulse generating apparatus according to claim 1, wherein
said output memory comprises a plurality of storage regions the number of which corresponds to that of output terminals of said output circuit, and the data stored in said storage regions are read out at the same time.

6. A pulse generating apparatus according to claim 5, wherein
a command stored in said command memory includes a command for writing into said plurality of storing regions the same output value at the same time.

7. A pulse generating apparatus including a central processor unit for outputting a command, comprising:
   command memory means for storing the command supplied from said central processor unit, said command including an output value for each time point at which a pulse is generated;
   sequencer means for subsequently reading out said output value from said command memory means, to execute said command readout and produce said output value;
   output memory means for storing said output value supplied from said sequencer means;
   a timer counter for outputting a reference time point signal; and
   output circuit means for reading out said output value from an address of said output memory means corresponding to the reference time point signal supplied from the timer counter and forming said pulse from said output value readout
   wherein said sequencer means executes said command read out from said command memory means only when the difference between the time point designated by said command and the reference time point designated by said reference time point signal supplied from said timer counter is less than the time duration predetermined by the memory capacity of said output memory means.

* * * * *